United States Patent [19]

Buehler et al.

[11] Patent Number: 5,145,821
[45] Date of Patent: Sep. 8, 1992

[54] SILICA SUPPORTED POLYMERIZATION CATALYST SYSTEM

[75] Inventors: Charles K. Buehler; Albert P. Masino, both of Naperville, Ill.

[73] Assignee: Quantum Chemical Corporation, New York, N.Y.

[21] Appl. No.: 717,956

[22] Filed: Jun. 20, 1991

Related U.S. Application Data

[63] Continuation-in-part of Ser. No. 521,302, May 9, 1990, Pat. No. 5,034,365.

[51] Int. Cl.$^5$ .............. C08F 4/651; C08F 4/655; C08F 4/656
[52] U.S. Cl. .................. 502/119; 502/120; 526/129
[58] Field of Search ................ 502/119, 120

[56] References Cited

U.S. PATENT DOCUMENTS

| | | | |
|---|---|---|---|
| 3,135,809 | 6/1964 | Bosmajian | 260/650 |
| 3,591,656 | 6/1971 | Kroll | 260/683.9 |
| 4,156,063 | 5/1979 | Giannini et al. | 526/114 |
| 4,220,554 | 9/1980 | Scata et al. | 252/429 B |
| 4,226,741 | 10/1980 | Luciani et al. | 252/429 B |
| 4,298,718 | 11/1981 | Myar et al. | 526/125 |
| 4,390,454 | 6/1983 | Cuffiani et al. | 252/429 B |
| 4,394,291 | 7/1983 | Hawley | 252/429 |
| 4,495,338 | 1/1985 | Mayr et al. | 526/126 |
| 4,503,159 | 3/1985 | Masino et al. | 502/111 |
| 4,508,843 | 4/1985 | Etherton et al. | 502/115 |
| 4,526,941 | 7/1985 | Sakurai et al. | 526/127 |
| 4,530,913 | 7/1985 | Pullukat et al. | 502/104 |
| 4,544,716 | 10/1985 | Hawley | 526/119 |
| 4,565,795 | 1/1986 | Short et al. | 502/110 |
| 4,595,735 | 6/1986 | Nomura et al. | 526/125 |
| 4,612,299 | 9/1986 | Arzoumanidis et al. | 502/104 |
| 4,647,550 | 3/1987 | Kohora et al. | 502/115 |
| 4,686,199 | 8/1987 | Tachikawa et al. | 502/104 |
| 4,738,942 | 4/1988 | Nowlin | 502/104 |
| 4,743,665 | 5/1988 | Sasaki et al. | 526/119 |
| 4,849,483 | 7/1989 | Tachikawa et al. | 526/97 |
| 4,857,613 | 8/1989 | Zolk et al. | 526/128 |
| 4,916,099 | 4/1990 | Sasaki et al. | 502/126 |
| 4,950,630 | 8/1990 | Murata et al. | 502/116 |
| 4,950,631 | 8/1990 | Buehler et al. | 502/119 |
| 5,034,365 | 7/1991 | Buehler et al. | 502/119 |

FOREIGN PATENT DOCUMENTS

| | | |
|---|---|---|
| 36148/89 | 12/1989 | Australia . |
| 0115833 | 8/1984 | European Pat. Off. . |
| 0193281 | 9/1986 | European Pat. Off. . |
| 0206172 | 12/1986 | European Pat. Off. . |
| 0244678 | 11/1987 | European Pat. Off. . |
| 0292134 | 11/1988 | European Pat. Off. . |
| 58-162607 | 7/1983 | Japan . |
| WO89/02446 | 3/1989 | PCT Int'l Appl. . |

*Primary Examiner*—Patrick P. Garvin
*Attorney, Agent, or Firm*—Kenneth D. Tremain; Richard G. Jackson

[57] ABSTRACT

A new catalyst component useful in the polymerization of at least one olefin is disclosed. The catalyst component comprises the product obtained by contracting silica, in random order, with (1) at least one hydrocarbon soluble magnesium-containing compound; and (2) a first modifying compound selected from the group consisting of silicon halides, boron halides, aluminum halides and mixtures thereof followed by a second modifying compound selected from the group consisting of halides having the structural formula $SiH_rX^2{}_s$, where $X^2$ is halogen; r is an integer of 1 to 3; and s is an integer of 1 to 3 with the proviso that the sum of r and s is 4, a hydrogen halide and mixtures thereof. The product of this step is contacted with a titanium-containing compound having the structural formula $TiX^1{}_p(OR^1)_q$, where $X^1$ is halogen; $R^1$ is hydrocarbyl; p is an integer of 1 to 4; and q is 0 or an integer of 1 to 3, with the provisos that the sum of p and q is 4 and that a second titanium-containing compound having the structural formula $Ti(OR)_mX_n$, where R is hydrocarbyl; X is halogen; m is an integer of 1 to 4; n is 0 or an integer of 1 to 3; and the sum of m and n is 4, is not utilized in the formation of said catalyst component.

A catalyst system comprising the above catalyst component, an aluminum-containing first cocatalyst and at least one silane second cocatalyst is also set forth.

Finally, a process for polymerizing at least one olefin utilizing the catalyst system of this disclosure is taught.

43 Claims, No Drawings

SILICA SUPPORTED POLYMERIZATION CATALYST SYSTEM

REFERENCE TO RELATED APPLICATION

This is a continuation-in-part of U.S. Pat. application, Ser. No. 521,302, filed May 9, 1990, and now U.S. Pat. No. 5,284,365 incorporated herein by reference.

BACKGROUND OF THE DISCLOSURE

1. Field of the Invention

The polymerization of olefins using Ziegler-Natta catalysts is widely utilized. These catalysts provide polyolefins possessing the desired characteristics of these polymers in high yield. However, the use of these conventional catalysts are subject to important failings. Thus, new and improved catalysts are continually being sought. An important class of catalysts where such improvement is sought are those catalysts which aid in the polymerization of the commercially very important alpha-olefin, propylene.

Commonly in the polymerization of many alpha-olefins, especially propylene, a catalyst having a magnesium halide support is utilized. However, when polyolefins, catalytically polymerized with a magnesium halide supported catalyst, are processed into molded products, the molding apparatus processing the polyolefin is subject to corrosion. This corrosion is caused by the residual presence of magnesium halide in the polymeric product. The adverse effect of this corrosion is not limited to damaging expensive molding machinery. More importantly, the polymeric molded article processed in this equipment is often characterized by aesthetic flaws.

Another detrimental property of catalysts, conventionally used in the polymerization of olefins, notably propylene polymers, is caused by their incorporation of internal electron donors. These donors are included in the catalyst to insure that the propylene polymer product is highly isotactic. Those skilled in the art are aware of the criticality of stereoregularity in propylene polymers. However, those skilled in the art are also aware that the presence of internal electron donors creates difficulties. Unless the amount and type of electron donor compound is carefully selected not only is the stereoregularity of the resultant polymer deficient but, in addition, poor catalytic activity often results. This detrimental effect occurs even if the amount and type of electron donor is properly chosen but the catalyst is formed with the electron donor compound added in the wrong sequence.

The utilization of electron donor compounds often creates additional problems involving offensive odors in the final polymeric product. This unfortunate result obtains even if the ideal electron donor compound, in the correct concentration, added at the proper time in the catalyst formation process, is utilized. Thus, polymers polymerized in the presence of catalysts which include an electron donor compound must oftentimes be deashed or deodorized in order to insure the absence of odor in the final product.

Very recently a patent application, a co-applicant of which is co-inventor of the present invention, defined a new catalyst which substantially overcomes the problems discussed above. That is, a new catalyst is therein described which produces olefinic polymers, especially propylene polymers, which possess high stereoregularity, uniform particle size distribution, good spherical morphology and high bulk density. Although this invention represents a significant advance in the art, improvements over it are highly desirable.

Although the catalyst of this new invention provides an activity in excess of those normally obtained in propylene polymerization, it is always desirable to improve this activity. Not only does a higher activity producing catalyst increase the efficiency of the polymerization process but insures a higher purity product. Those skilled in the art are aware that the effect of higher activity not only reduces the amount of catalyst required per unit weight of polymer product but this also translates into lower catalyst concentration in the final polymeric product.

It is also noted that the catalyst of this recent application produces a polymer having excellent bulk density and as a corollary thereof, low fines concentration. However, these properties, like other properties, are always subject to improvement. Those skilled in the art are aware that the greater the bulk density, the greater the productivity of a polymerization process independent of catalyst activity. The greater the bulk density, the greater the weight of polymer produced per unit volume of reactor. The lower the fines concentration, that is, the lower the concentration of very small polymer particles, moreover, the lesser the problem associated with plugging of process equipment, conduits and, especially, filters. Such plugging causes serious interruptions in production schedules.

Another desirable property that the significantly improved catalyst of the recent prior art does not fully address is the catalyst's hydrogen response. Those skilled in the olefin polymerization art are aware that variation of hydrogen concentration in olefin polymerization reactions affects catalyst activity as well as polymer properties. Certain catalysts enhance these results, others diminish them and yet others have little effect.

The above remarks make clear the continuing need in the art for a new olefin polymer catalyst having the desirable properties considered above. They also establish that although recent prior art has significantly addressed these needs further improvements are highly desired in the art.

2. Background of the Prior Art

Japanese Patent Publication 162,607/1983 attempts to eliminate the problem created by halogen-containing carriers. In this disclosure inorganic oxides, such as silica, were proposed as a catalyst support. This carrier, containing no halogen, was reacted with a magnesium dialkoxide and an electron donor, such as a carboxylic acid monoester, and a titanium halide compound.

Even if the allegations made in this disclosure of high catalytic activity, production of a highly stereospecific polymer having a high bulk density and narrow particle size distribution were correct, the problems associated with catalyst odor were not addressed. However, testing of this catalyst established that the catalyst provided less than desired activity and that the olefinic polymer product was wanting in stereoregularity and particle size distribution.

A more recent disclosure, U.S. Pat. No. 4,595,735, provides a catalytic component for the polymerization of olefins prepared by contacting a magnesium alkoxide, a halogenated hydrocarbon, a halogenated silane and a titanium compound. It is emphasized that this catalyst, useful in the polymerization of ethylene homopolymers and copolymers, incorporates a halogenated hydrocarbon. This catalyst is not only principally directed at the polymerization of ethylene polymers but, significantly, emphasizes the formation of high melt index polymers. Those skilled in the art are aware that however useful this catalyst is in ethylenic polymer applications, its application to propylene polymers is restricted. Most propylene polymers are used in applications requiring a polymer of low melt flow rate. That is, the molecular weight of the polymers produced in accordance with the '735 catalyst is significantly lower than that required of polypropylene.

U.S. Pat. No. 4,565,795 sets forth an olefin polymerization catalyst which is prepared by the reaction of a chemically treated silica support with a dihydrocarbyl magnesium compound and a halogenated tetravalent titanium compound. The chemical treatment of the silica support involves the use of a chlorinating compound, an alkanol, a silylating compound, an acid chloride or an organoboron compound. Again, this catalyst includes constituents which are adverse to the production of stereoregular polymers, especially polypropylene. It is thus not surprising that this catalyst is suggested for use in the polymerization of ethylene polymers.

U.S. patent application, Ser. No. 326,708, filed Mar. 21, 1989, now U.S. Pat. No. 4,950,631, a co-inventor of which is a co-inventor of the present invention, now U.S. Pat. No. 4,950,631, a co-inventor addresses many but not all of the demands required of olefin catalysts. This catalyst has been discussed earlier.

U.S. Pat. No. 4,394,291 discloses a catalyst useful in the polymerization of olefins. This catalyst involves the reaction of a Group II metal dihalide with a transition metal compound. It is noted that in an alternate embodiment this reaction also involves an electron donor. This product is, in turn, reacted with an organoaluminum compound. Finally, the product of this further reaction is reacted with a halide ion exchanging source. Such a source may be a multiplicity of agents of which the combination of titanium tetrachloride with any one of silicon tetrachloride, trichlorosilane, dichlorophenylsilane and dichlorodiphenylsilane is preferred.

U.S. Pat. No. 4,503,159 describes an olefin polymerization catalyst formed by reacting water with a magnesium dihalide in the presence of a phase transfer catalyst and reacting this product with a benzoic acid ester, an alkoxytitanium compound, an organoaluminum halide and a halogen ion exchanging source. The preferred halogen ion exchanging source is titanium tetrachloride or titanium tetrachloride and a silicon halide which may be trichlorosilane and/or silicon tetrachloride.

U.S. Pat. No. 4,544,716 sets forth a similar catalyst to the '159 patent wherein, again, a halide ion exchanging source is utilized. A particular preferred source is titanium tetrachloride, trichlorosilane and silicon tetrachloride present in a molar ratio in the range of about 2.5:2:1 to 4:3.5:1. The volume of these components are preferably such that the combined volume of the trichlorosilane and silicon tetrachloride equals that of the titanium tetrachloride.

European patent application no. 0 115 833 discusses an olefin polymerization catalyst in which a magnesium dihalide combined with water is reacted with a benzoic acid ester and an alkoxytitanium compound to form a first catalyst component. This first component is reacted with a organoaluminum halide. The solid product of this reaction is reacted with a halide ion exchanging source. The ion exchanging source in a preferred embodiment is titanium tetrachloride, trichlorosilane and silicon tetrachloride.

SUMMARY OF THE INVENTION

The present invention is directed to a catalyst system which, when added to olefin polymerization reactants, produces olefin homopolymers and copolymers of high stereoregularity. The polymeric product of polymerization reactions using the catalyst system of this invention is characterized by uniform particle size distribution, good spherical morphology and high bulk density. These characteristics enhance the productivity and processability of the polymer. In addition, the catalyst system is itself highly active, resulting in high polymer productivity, as manifested by weight of polymer per unit weight of catalyst per hour.

The catalyst system of this invention is also characterized by safe and easy preparation. Unlike the preparation of magnesium halide supported catalyst components, expensive ballmilling is not required. Neither are other expensive prepolymerization steps, required of magnesium halide supported catalyst components, necessary. Because the catalyst component includes no halogen in the support, the product polymer has low halogen content, significantly reducing the problems of corrosion oftentimes encountered in the processing of such polymers produced from magnesium halide supported catalyst components. Moreover, because the catalyst component retains low residual metal content, no deashing of the polymer product is required. Additionally, the polymerization reaction utilizing this catalyst system is enhanced due to its outstanding activity, which is relatively constant over long periods of time. Finally, the use of the subject catalyst system allows for enhanced activity and easy control of polymer molecular weight with the judicious addition of hydrogen.

In accordance with the present invention a catalyst component is provided. The catalyst component comprises the product obtained by initially contacting silica with at least one hydrocarbon soluble magnesium compound and at least two modifying compounds. The sequence of contact with silica by the hydrocarbon soluble magnesium compound and the first and second modifying compounds is random with the requirements, however, that the first modifying compound contact the silica before the second modifying compound and that the modifying compounds contact the silica without interruption by contact with the hydrocarbon soluble magnesium compound. The first modifying compound is selected from the group consisting of silicon halides, boron halides, aluminum halides and mixtures thereof. The second modifying compound, which contacts the silica after the first modifying compound, is selected from the group consisting of halogenated silanes of the formula $SiH_rX^2_s$, where $X^2$ is halogen; r is an integer of 1 to 3; and s is an integer of 1 to 3, with the proviso that the sum of r and s is 4, hydrogen halides of the formula $HX^3$, where $X^3$ is halogen, and mixtures thereof. The modified silica supporting magnesium is next contacted with a titanium-containing compound having the structural formula $TiX^1_p(OR^1)_q$ where $X^1$ is halogen; $R^1$ is hydrocarbyl; p is an integer of 1 to 4; and q is 0 or an integer of 1 to 3, with the provisos that the sum of p and q is 4 and that a second titanium-containing compound having the formula $Ti(OR)_mX_n$, where R is hydrocarbyl; X is halogen; m is an integer of 1 to 4; n is 0 or an integer of 1 to 3; and the sum of m and n is 4, is not utilized in the formation of the catalyst component.

In another aspect of the present invention a catalyst system is described. The catalyst system comprises the above catalyst component, a first co-catalyst component, an aluminum-containing compound, and a second co-catalyst component, a hydrocarbylalkoxysilane.

In still another aspect of the present invention a process for polymerizing olefins is disclosed. In this process at least one olefin is polymerized under olefin polymerization conditions utilizing the catalyst system of the present invention, which includes the catalyst component of the present invention, the first co-catalyst component, an aluminum-containing compound, and the second co-catalyst component, a hydrocarbylalkoxysilane.

DETAILED DESCRIPTION

The catalyst component of the present invention is prepared by initially contacting silica with at least one hydrocarbon soluble magnesium compound and at least two modifying compounds.

The silica employed in the catalyst component of the subject invention is preferably pure but may contain minor amounts of other inorganic oxides such as alumina, titania, zirconia, magnesia and the like. In general, the silica support comprises at least 90% by weight pure silica. More preferably, the weight percentage of pure silica is at least 95%. Most preferably, the weight percentage of pure silica is at least 99%.

The silica utilized in the formation of the catalyst component, is preferably defined by a surface are in the range of between about 80 m$^2$/g. and about 300 m$^2$/g., a median particle size of about 20 microns to about 200 microns and a pore volume of between about 0.6 cc/g. and about 3.0 cc/gram.

In a preferred embodiment the silica employed in the preparation of the catalyst component is treated to replace hydroxyl groups on the surface of the silica with a surface characterized by the structural formula

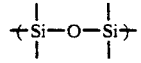

To accomplish this replacement the silica may be calcined in an inert atmosphere at a temperature of at least 150° C. Preferably, the calcining operation involves heating the silica at a temperature in the range of between about 550° C. and about 650° C. in an inert atmosphere, preferably provided by nitrogen gas.

Another method of treating the silica used in making the catalyst component involves contacting the silica with a hexaalkyl disilazane. Of the hexaalkyl disilazanes useful in this application, hexamethyl disilazane is preferred.

Yet a third method of treating silica to replace its hydroxyl-containing surface is to subject the silica to both treatment with a hexaalkyl disilazane and calcination. In this method, the sequence of these processing steps is random. However, it is preferred that the hexaalkyl disilazane treatment precede calcination. It is also noted that in this latter preferred embodiment calcination need only constitute exposure to a temperature of at least about 100° C., although higher temperature exposure is certainly not detrimental.

As stated above, the silica is contacted with at least one hydrocarbon soluble magnesium-containing compound. Hydrocarbon soluble magnesium compound that can be used in the preparation of the catalyst component of this invention include dihydrocarbyloxymagnesiums, hydrocarbyloxymagnesium halides and mixtures thereof. Preferably, the magnesium compounds are dialkoxymagnesiums, alkoxymagnesium halides and mixtures thereof. Especially preferred magnesium compounds, contemplated for use in the preparation of the catalyst component of the present invention include 2methyl-1-pentyloxymagnesium chloride, pentyloxymagnesium chloride, 2-ethyl-hexyloxymagnesium chloride, di2-ethyl-1hexyloxmagnesium and mixtures thereof. Of these, 2-ethyl-1-hexyloxymagnesium chloride and 2-methyl-1-pentyloxymagnesium chloride are particularly preferred with 2-methy-1-pentyloxymagnesium most preferred.

The contact between the silica and the soluble magnesium compound or compounds usually occurs at a temperature in the range of between about 15° C. and about 120° C. More preferably, this contact occurs at a temperature in the range of between about 50° C. and 110° C. The contact occurs over a period of between about 30 minutes and about 4 hours. Preferably, the contact occurs over a period of between about 1 hour and about 3½ hours. Still more preferably, this contact occurs over a period of between about 1½ hours and about 2½ hours.

In addition to the silica contacting at least one soluble magnesium compound, the silica also contacts at least two modifying compounds. The first of these modifying compounds is selected from the group consisting of silicon halides, having the structural formula SiX$^4$$_4$, boron halides, having the structural formula BX$^5$$_3$, aluminum halides having the structural formula AlX$^6$$_3$, where X$^4$, X$^5$ and X$^6$ are the same or different and are halogen, and mixtures thereof. Preferably, X$^4$, X$^5$ and X$^6$ are the same or different and are chlorine or bromine. Thus, it is preferred that the first modifying compound be silicon tetrachloride, silicon tetrabromide, boron trichloride, boron tribromide, aluminum trichloride, aluminum tribromide or mixtures thereof. It is more preferred that X$^4$, X$^5$ and X$^6$ be chlorine. Thus, it is preferred that the first modifying compound be silicon tetrachloride, boron trichloride, aluminum trichloride or mixtures thereof. Of these, silicon tetrachloride is most preferred.

The second modifying compound, which contacts the silica sequentially after contact with the first modifying compound, is selected from the group consisting of a halogenated silane having the structural formula SiH$_r$X$^2$$_s$, where X$^2$ is halogen; r is an integer of 1 to 3; and s is an integer of 1 to 3, with the proviso that the sum of r and s is 4, a hydrogen halide having the structural formula HX$^3$, where X$^3$ is halogen, and mixtures thereof.

Preferably, the second modifying compound having one of the two structural formulae given above is characterized by X$^2$ and X$^3$ being the same or different and being chlorine or bromine. In the preferred embodiment wherein the second modifying compound is the silane, it is further preferably characterized by r being an integer of 1 or 2 and s being an integer of 2 or 3. Still more preferably, the second modifying compounds are characterized by both X$^2$ and X$^3$ being chlorine and, in the case of the silane compound, r being 1 and s being 3.

Among the preferred second modifying compounds are trichlorosilane, tribromosilane, dichlorosilane, dibromosilane, hydrogen chloride, hydrogen bromide and mixtures thereof. Of these, trichlorosilane, hydrogen chloride and mixtures are more preferred. The use of trichlorosilane as the second modifying compound is most preferred.

The concentrations of the first and second modifying compounds preferably utilized in the formation of the catalyst component are such that the molar ratio of first to second modifying compound is in the range of between about 50:50 and about 99:1. More preferably this molar ratio of the first to the second modifying compound is in the range of between about 60:40 and about 95:5, respectively. Still more preferably, this molar ratio is in the range of between about 70:30 and about 92:8. Even still more preferably, this molar ratio is in the range of between about 80:20 and about 90:10.

There is preferably no appreciable time duration between contact of the silica with the first and second modifying compounds. This contact is preferably sequential. That is, it is preferred that the first and second modifying compounds contact the silica in sequential order, the second modifying compound right after the first modifying compound. The contact between the silica, whether previously contacted with the hydrocarbon soluble magnesium compound or not, with the first and second modifying compounds, preferably occurs at a temperature in the range of between about 10° C. and about 60° C. More preferably, the temperature of contact between the silica and the modifying compounds is in the range of between about 20° C. and about 55° C. Still more preferably, this contact occurs at a temperature of between about 25° C. and about 50° C. Most preferably, the contact temperature is in the range of about 30° C. and about 45° C. The duration of contact is preferably between about 10 minutes and about 2 hours. More preferably, the period of time over which contact occurs is between about 20 minutes and 1½ hours. Still more preferably, the time duration over which contact between silica and modifying compounds occurs is between about 30 minutes and about 1 hour.

Although the order of contact between the silica and the magnesium compound and the silica and the modifying compounds is random, it is again emphasized that the first modifying compound contacts the silica prior to contact with the second modifying compound. It should be appreciated, however, that although the sequence of contact with silica by the magnesium and modifying compounds is random, it is preferred that the silica initially contact the magnesium compound followed by contact with the first and then the second modifying compounds.

In a preferred embodiment, the product of contact between the silica and the hydrocarbon soluble magnesium compound and the modifying compounds is next washed. That is, the product is washed with an organic solvent to remove any organic-soluble residue. Although the organic solvent may be any solvent in which the solid product does not dissolve, it is preferred that the solvent be a hydrocarbon, either aliphatic or aromatic. Of these hydrocarbons, alkanes of 5 to 15 carbon atoms are more preferred. Of these, hexane and heptane are even more preferred. Heptane is most preferred.

In the washing step the product is immersed in the solvent with stirring at ambient temperature. The solvent is thereafter removed by decantation, siphoning or the like. This procedure may be repeated. Indeed, this washing step is preferably repeated two to four times.

The final step in the preparation of the catalyst component of this invention involves contacting the silica treated earlier with the magnesium-containing compound and the modifying compounds, whether washed or unwashed, with a titanium-containing compound having the structural formula $TiX^1_p(OR^1)_q$ where $X^1$ is halogen, $R^1$ is hydrocarbyl; p is an integer of 1 to 4; and q is 0 or an integer of 1 to 3 with the proviso that the sum of p and q is 4.

The catalyst component of this invention is further characterized by the limitation that a second titanium-containing compound having the structural formula $Ti(OR)_mX_n$, where R is hydrocarbyl; X is halogen; m is an integer of 1 to 4; and n is 0 or an integer of 1 to 3, with the proviso that the sum of m and n is 4, is not employed in its formation. A preferred further limitation is that the titanium-containing compound utilized in the formation of the catalyst component, the aforementioned compound having the structural formula $TiX^1_p(OR^1)_q$, is the only titanium-containing compound utilized in the formation of the catalyst component.

In a preferred embodiment, the titanium-containing compound is characterized by its above-defined structural formula where $X^1$ is chlorine or bromine; R is alkyl; p is an integer of 2 to 4; and q is 0, 1 or 2. Compounds within the scope of this preferred embodiment, preferred for use in the preparation of the catalyst component of the present invention, include titanium tetrachloride, titanium tetrabromide, methoxytitanium trichloride, methoxytitanium tribromide, ethoxytitanium trichloride, ethoxytitanium tribromide, dimethoxytitanium dichloride, dimethoxytitanium dibromide, diethoxytitanium dichloride, diethoxytitanium dibromide and the like.

Still more preferably the titanium-containing compound is defined by p being an integer of 4 and q being 0. That is, the titanium compound is titanium tetrachloride or titanium tetrabromide. Of the two, titanium tetrachloride is particularly preferred for use as the titanium-containing compound.

The titanium-containing compound and the silica composition with which it is contacted are exposed to a temperature in the range of between about 60° C. and about 130° C. Preferably, these constituents are subjected to a temperature in the range of between about 75° C. and about 120° C. More preferably, the temperature of this contact is in the range of between about 85° C. and about 115° C. Most preferably, this temperature range is between about 90° C. and about 105° C.

The time duration of this contact at elevated temperature is between about 15 minutes and about 3 hours. Preferably, this time duration is in the range of between about 30 minutes and 2 hours. More preferably, the time of contact between the silica composition and the titanium-containing compound is between about 45 minutes and about 1½ hours.

An optional preferred step in the formation of the catalyst component involves washing of the product of contact of the silica composition and the titanium-containing compound. The washing of this product involves the same process discussed above in the discussion of the washing of the silica composition prior to treatment with the titanium-containing compound. Thus, the use of hydrocarbon solvents of the types discussed in the preferred first washing step is preferred. It is desirable, however, in the preferred embodiment wherein the product of the titanium compound contact is washed, that the number of washing cycles be increased. Thus, whereas the first washing step preferably employs about two to four washing cycles, it is preferred that this second optional washing procedure involve about six to eight washing cycles.

It should be appreciated that all the treatment steps in the formation of the catalyst component of this invention, the contact of silica with the hydrocarbon soluble magnesium compound, the modifying compounds and the titanium-containing compound, involve contact between a solid, silica, and a liquid. This is because each of the compounds that are contacted with silica are liquids or are soluble in an inert hydrocarbon solvent under the conditions of use. As such, no ballmilling or other solid mixing is required. This expensive and difficult operation, usual in the formation of polymerization catalysts of the prior art, is thus eliminated. Those skilled in the art are aware, in the case where a hydrocarbon solvent is employed, that the solvent may be allowed to remain with the reaction mass or can be removed by decantation, filtration, evaporation or the like.

Further observations regarding the above catalyst component formation steps include the facts that the morphology of the polymer produced from this catalyst emulates the support; that the absence of any halogen in the support aids in keeping the halogen content of the polymer produced therefrom low; that the relatively low concentrations of titanium and magnesium on the silica support also tends to keep polymeric magnesium and titanium concentrations at similarly low levels; that the preparation of the catalyst component of the present invention is conducted at moderate temperature, preferably in the range of between about 0° C. and 100° C.; and that even though this catalyst component does not need an electron donor for excellent isotacticity it is possible to use one or more of them if desired.

Another aspect of the present invention is directed to a catalyst system. The catalyst system of this invention comprises the catalyst component described in detail above, a first co-catalyst component and a second co-catalyst component.

The first co-catalyst component of the catalyst system is an aluminum-containing compound. The aluminum-containing compound is preferably an alkylaluminum-containing compound. The alkylaluminum-containing compound is preferably a trialkylaluminum, alkylaluminum halide or mixtures thereof. More preferably, the co-catalyst is a trialkylaluminum. Of the trialkylaluminums, triethylaluminum and tri-n-propylaluminum are particularly preferred with triethylaluminum most preferred.

The second co-catalyst component of the catalyst system is preferably at least one silane compound Preferably, the silane compound is a hydrocarbylalkoxysilane. Preferred hydrocarbylalkoxysilanes include hydrocarbyltrialkoxysilanes, dihydrocarbyldialkoxysilanes and trihydrocarbylalkoxysilanes. Of these, the dihydrocarbyldialkoxysilanes and the trihydrocarbylalkoxysilanes are more preferred with the dihydrocarbyldialkoxysilanes most preferred.

The hydrocarbyl constituent of the silane second co-catalyst component is preferably phenyl, alkaryl, or $C_1$–$C_{10}$ linear, branched or cyclic alkyl. The preferred alkoxy constituent is one containing one to six carbon atoms.

Of the dihydrocarbyldialkoxysilanes, diisopropyldimethoxysilane and isobutylisopropyldimethoxysilane are particularly preferred with diisopropyldimethoxysilane most preferred.

In still another aspect of the present invention a process for polymerizing an olefin is set forth. This process comprises polymerizing at least one olefin under olefin polymerization conditions in the presence of the catalyst system of the present invention. That is, in the presence of the catalyst component of the subject invention, the first co-catalyst component and the second co-catalyst component.

In a particularly preferred embodiment of this aspect of the present invention, the olefin polymerized is propylene. In this preferred embodiment, polymerization occurs at a temperature in the range of between about 35° C. and about 100° C. More preferably, the temperature of this reaction is in the range of about 50° C. and about 80° C. The pressure of the propylene polymerization reaction is in the range of between about 300 psig and about 600 psig, more preferably, between about 400 psig and about 500 psig. In a preferred embodiment the propylene polymerization occurs in the presence of hydrogen gas.

The following examples are given to illustrate the scope of this invention. Because these examples are given for illustrative purposes only, the invention embodied therein should not be limited thereto.

EXAMPLE 1

Preparation of Catalyst Component

A master batch of 2-methyl-1-pentyloxymagnesium chloride was prepared by charging Davison [trademark] 948 silica treated with hexamethyl disilazane (6 lb) into a ribbon blender. The contents were heated under a nitrogen atmosphere at a temperature of between 90° and 100° C. for one hour. After the heating step the blender and its silica contents were cooled to room temperature.

To the cooled silica in the, blender was added a solution of 17.2 wt% 2-methyl-1-pentyloxymagnesium chloride in heptane (16.8 lb). Stirring was commenced and the contents of the blender were heated under a nitrogen atmosphere for 2 to 3 hours at 100° C. At the conclusion of this period 67% by weight of the solvent was evaporated leaving a dry, free flowing solid product. The solid product was analyzed and found to possess a chemical constituency as follows:

| Constituent | Wt % |
|---|---|
| Si | 47.9 |
| Mg | 4.67 |
| Cl | 15.8 |
| Hydrocarbon Solv. | 31.63 |

This master batch was stored in a water-free and oxygen-free environment.

2-Methyl-1-pentyloxymagnesium chloride master batch (8 gm.) was introduced into a four-necked round bottom 250 ml. flask equipped with a paddle stirrer and a nitrogen purge. Heptane (10 ml.) was added to the flask and stirring was commenced. To this suspension was added silicon tetrachloride (2.55 ml., 20 mmol.) followed immediately by trichlorosilane (0.45 ml., 4 mmol.). The contents of the flask were stirred for 40 minutes at 40° C. The thus heated contents were cooled to room temperature and washed with heptane (70 ml.).

This washing step was repeated twice for a total of three times.

The washed product was returned to the flask and was contacted with titanium tetrachloride (10 ml., 90 mmol.) at room temperature. The contents were heated for 1 hour at 90° C. The solid product resulting therefrom was washed with heptane (80 ml.). This washing step was repeated five times for a total of six times. The washed solid product was dried with nitrogen gas, free of water and oxygen.

The product was analyzed by X-ray fluorescence and was found to possess titanium, magnesium, silica and chlorine in the concentrations set forth in the Table.

COMPARATIVE EXAMPLE 1

Preparation of Catalyst Component

Example 1 was identically repeated but for the addition of the step of contacting the solid product washed three times with heptane with a 50% by volume solution of titanium tetracresylate in heptane (1.2 ml., 2 mmol.).

This step was included prior to contact with titanium tetrachloride. It is noted that the contact with the titanium tetrachloride was added to the solid product 5 minutes after contact with the titanium tetracresylate.

The product of this example was analyzed by X-ray fluorescence and its titanium, magnesium, silica and chlorine constituency determined. These concentrations are reported in the Table.

EXAMPLE 2

Polymerization of Propylene

The catalyst component (0.02 g.) prepared in accordance with Example 1 was charged into a 1-liter Parr [trademark] reactor with triethylaluminum (TEAL) and isobutylisopropyldimethoxysilane (IBIP). The concentrations of TEAL and IBIP introduced into the reactor were such that the molar ratio of TEAL to IBIP to catalyst component made in accordance with Example 1 was 80:8:1.

To the catalyst system contents of the reactor was added heptane (20 ml). Thereupon, hydrogen gas (400 ml.) and then propylene (325 g.) was added thereto. The contents were then heated to 70° C. for 1 hour at a pressure of 460 psig.

The polypropylene product of this polymerization reaction was weighed and analyzed. The results of these observations are included in the Table.

It is noted that the critical % hydrocarbon insoluble property of the polypropylene product reported in the Table is determined by a procedure in which a ground polypropylene sample passing through a 20 mesh screen (1 g. to 1.5 g.) is dried in a vacuum oven for 30 minutes at 100° C. The dried sample, disposed in a thimble, whose exact weight is determined, is dried in a desiccator and cooled to room temperature. The thimble containing the ground polypropylene sample is weighed and then placed in an extraction flask provided with about 150 ml. heptane and some boiling chips. The flask is thereupon connected to a condenser. With cooling water flowing, the condenser is heated. After two hours of boiling the heptane solvent, heating is stopped and the thimble is removed from the condenser flask. The thimble and its polypropylene contents are again heated in a vacuum oven at 100° C. for 30 minutes and thereafter cooled to room temperature in a desiccator. The thimble and its contents are again weighed. The weight of the polypropylene after reflux divided by its weight prior to reflux represents % hydrocarbon insoluble.

COMPARATIVE EXAMPLE 2

Polymerization of Propylene

The polymerization of Example 2 was identically repeated but for the substitution of a like charge of the catalyst component of Comparative Example 1 for the catalyst component of Example 1 utilized in Example 2. The results of this example are included in the Table.

TABLE

| Cat. Comp. of Ex. No. | Catalyst Component[1] | | | | Poly. of Ex. No. | Polymerization Results | | | |
|---|---|---|---|---|---|---|---|---|---|
| | | | | | | Activity PP/g.Cat | Ti, ppm | Polypropylene Characteristics | |
| | Ti | Mg | Si | Cl | | | | % Hydrocarbon Insol. | Bulk Den, lb/ft³ |
| 1 | 5.3 | 3.9 | 47.3 | 13.1 | 2 | 7,500 | 7.9 | 98.0 | 25.6 |
| CE1 | 4.5 | 3.6 | 47.1 | 20.5 | CE2 | 10,000 | 4.4 | 95.9 | 23.0 |

Footnotes:
[1]Reported as % by Wt.

DISCUSSION OF EXAMPLES

An analysis of the results of the examples establish that although catalyst activity is reduced in the absence of titanium tetracresylate, the polypropylene produced in accordance with the invention of the present application has marginally improved crystallinity. This is manifested by the hydrocarbon insolubility of the polypropylene. As those skilled in the art are aware, the higher the percent hydrocarbon insoluble, the higher is the degree of crystallinity of the polypropylene. The higher the degree of crystallinity the more useful the polymer in certain processing schemes and in upscale applications.

For example, polypropylene having a higher degree of crystallinity is much more readily injection molded. Similarly, impact resistance of molded polypropylene is very sensitive to crystallinity. Impact resistance, critical in the use of polypropylene in engineering resin applications, such as automobile bumpers, is directly dependent upon the degree of crystallinity.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

WHAT IS CLAIMED IS:

1. A catalyst component comprising the product prepared by the steps of:
   (a) contacting silica with components
      (1) at least one hydrocarbon soluble magnesium-containing compound; and
      (2) a first modifying compound selected from the group consisting of silicon halide; boron halides, aluminum halides and mixtures thereof followed by a second modifying compound selected from the group consisting of a silane of the formula $SiH_rX^2_s$, where $X^2$ is halogen; r is an integer of 1 to 3; and s is an integer of 1 to 3, with the proviso that the sum of r and s is 4, hydrogen halides having the structural formula $HX^3$, where $X^3$ is halogen, and mixtures thereof, said sequence of contact of silica with said components (1) and (2) being random; and (b) contacting the product of step (a) with a titanium-containing compound having the structural formula $TiX^1_p(OR^1)_q$, where $X^1$ is halogen; $R^1$ is hydrocarbyl; p is an integer of 1 to 4; q is 0 or an integer of 1 to 3, with the provisos that the sum of p and q is 4 and that a second titanium-containing compound having the structural formula $Ti(OR)_mX_n$, where R is hydrocarbyl; X is halogen; m is an integer of 1 to 4; n is 0 or an integer of 1 to 3; and the sum of m and n is 4, is not utilized in the formation of said catalyst component.

2. A catalyst component in accordance with claim 1 wherein said silica is at least 90% pure silica having a surface area of between about 80 m²/g. and about 300 m²/g., a medium particle size of between about 20 microns and about 200 microns and a pore volume of between about 0.6 cc/g. and about 3.0 cc/g.

3. A catalyst component in accordance with claim 1 wherein said silica is pretreated, prior to step (a), to replace surface hydroxyl with a surface characterized by the structural formula

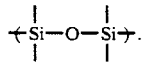

4. A catalyst component in accordance with claim 3 wherein said silica pretreatment comprises calcining said silica at a temperature of at least about 150° C. in an inert atmosphere.

5. A catalyst component in accordance with claim 3 wherein said silica pretreatment comprises contacting said silica with a hexaalkyl disilazane.

6. A catalyst component in accordance with claim 3 wherein said silica pretreatment comprises (a) contacting said silica with a hexaalkyl disilazane and (b) calcining said silica at a temperature of at least about 100° C. in an inert atmosphere, said steps (a) and (b) occurring in random order.

7. A catalyst component in accordance with claim 1 wherein said hydrocarbon soluble magnesium compound is selected from the group consisting of dihydrocarbyloxymagnesiums, hydrocarbyloxymagnesium halides and mixtures thereof.

8. A catalyst component in accordance with claim 1 wherein said first modifying compound is selected from the group consisting of silicon tetrachloride, boron trichloride and aluminum trichloride.

9. A catalyst component in accordance with claim 1 wherein said second modifying compound or compounds are characterized by $X^2$ and $X^3$ being the same or different and being chlorine or bromine; r being 1 or 2; and s being 2 or 3.

10. A catalyst component in accordance with claim 1 wherein said titanium-containing compound is characterized by $X^1$ being chlorine or bromine; $R^1$ being alkyl; p being an integer of 2 to 4; and q being 0, 1 or 2.

11. A catalyst component in accordance with claim 1 wherein said silica in step (a) contacts component (1) prior to contact with component (2).

12. A catalyst component in accordance with claim 1 wherein said first modifying compound and said second modifying compound contact said silica in an amount such that the molar ratio of said first modifying compound to said second modifying compound is in the range of between about 50:50 and about 99:1.

13. A catalyst component in accordance with claim 1 including the step of washing said product of step (a) with an organic solvent prior to said step (b).

14. A catalyst component in accordance with claim 1 including the step of washing said product of step (b) with an organic solvent.

15. A catalyst component in accordance with claim 1 wherein said contact between said silica and said hydrocarbon soluble magnesium compound of step (a) occurs at a temperature in the range of between about 15° C. and about 120° C. over a period in the range of between about 30 minutes and 4 hours.

16. A catalyst component in accordance with claim 1 wherein said contact between said silica and said first and second modifying compounds of step (a) occurs at a temperature of between about 10° C. and about 60° C. over a period of between about 10 minutes and about 2 hours.

17. A catalyst component in accordance with claim 1 wherein said step (b) occurs at a temperature in the range of between about 60° C. and about 130° C. over a period in the range of between 15 minutes and about 3 hours.

18. A catalyst component comprising the product prepared by the steps of:
(a) contacting silica, pretreated to replace surface hydroxyl groups with a-surface characterized by the structural formula

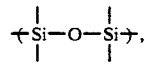

with components:
(1) a compound selected from the group consisting of a dihydrocarbyloxymagnesium, a hydrocarbyloxymagnesium halide and mixtures thereof; and
(2) a first modifying compound selected from the group consisting of a silicon tetrahalide, a boron trihalide and an aluminum trihalide followed by a second modifying compound selected from the group consisting of halogenated silane having the structural formula $SiH_rX^2_s$, where $X^2$ is halogen; r is an integer of 1 or 2; and s is an integer of 2 or 3, with the proviso that the sum of r and s is 4, a hydrogen halide having the structural formula $HX^3$, where $X^3$ is chlorine or bromine, and mixtures thereof; said first and said second modifying compounds contacting said silica in an amount such that the molar ratio of said first to said second modifying compound is in the range of between about 50:50 and about 99:1, said sequence of contact of said components (1) and (2) with silica being random; and
(b) contacting the product of step (a) with a titanium compound having the structural formula TiX- $_pX^1_p(OR^1)_q$, where $X^1$ is chlorine or bromine; $R^1$ is alkyl; p is an integer of 2 to 4; and q is 0, 1 or 2, with the provisos that the sum of p and q is 4 and that a second titanium-containing compound having the structural formula $Ti(OR)_mX_n$, where R is hydrocarbyl; X is halogen; m is an integer of 1 to 4; n is 0 or an integer of 1 to 3; and the sum of m and n is 4, is not utilized in the formation of said catalyst component.

19. A catalyst component in accordance with claim 18 wherein said silica is pretreated by:
    (a) calcining said silica at a temperature of at least about 150° C. in an inert atmosphere,
    (b) treating said silica with a hexaalkyl disilazane or
    (c) in random order, calcining said silica at a temperature of at least about 100° C. in an inert atmosphere and treating said silica with a hexaalkyl disilazane.

20. A catalyst component in accordance with claim 19 wherein said calcining step (a) occurs at a temperature in the range of between about 550° C. and about 650° C. in a nitrogen atmosphere, and said hexaalkyl disilazane of steps (b) and (c) is hexamethyl disilazane.

21. A catalyst component in accordance with claim 18 wherein said component (1) is a hydrocarbyloxymagnesium halide.

22. A catalyst component in accordance with claim 21 wherein said hydrocarbyloxymagnesium halide is selected from the group consisting of 2-methylpentyloxymagnesium chloride and 2-ethylhexyloxymagnesium chloride.

23. A catalyst component in accordance with claim 22 wherein said first modifying compound of component (2) is silicon tetrachloride.

24. A catalyst component in accordance with claim 23 wherein said second modifying compound of component (2) is selected from the group consisting of dichlorosilane, trichlorosilane, hydrogen chloride and mixtures thereof 25. A catalyst component in accordance with claim 24 wherein said second modifying compound of component (2) is trichlorosilane.

26. A catalyst component in accordance with claim 25 wherein said molar ratio of component (1) to component (2) is in the range of between about 60:40 and about 95:5.

27. A catalyst component in accordance with claim 26 wherein said sequence of contact of silica with components (1) and (2) in step (a) is component (1) followed by component (2).

28. A catalyst component in accordance with claim 25 wherein said titanium-containing compound is characterized by p being 4 and n being 0.

29. A catalyst component in accordance with claim 28 wherein said titanium-containing compound is titanium tetrachloride.

30. A catalyst component in accordance with claim 18 wherein said contact between said silica and said hydrocarbyloxymagnesium halide of step (a) occurs at a temperature of between about 50° C. and about 110° C. over a period of between about 1 hour and about 3½ hours.

31. A catalyst component in accordance with claim 30 wherein said contact between said silica and said first and said second modifying compounds of step (a) occurs at a temperature in the range of between about 20° C. and about 55° C over a period of between about 20 minutes and about 1½ hours.

32. A catalyst component in accordance with claim 31 wherein said step (b) occurs at a temperature in the range of between about 75° C. and about 120° C. over a period in the range of between about 30 minutes and about 4 hours.

33. A catalyst component in accordance with claim 32 comprising the step of washing the product of step (a) with an alkane containing 5 to 15 carbon atoms prior to said step (b).

34. A catalyst component in accordance with claim 33 comprising the step of washing the product of step (b) with an alkane having 5 to 15 carbon atoms.

35. A catalyst component comprising the product prepared by the steps of:
    (a) contacting silica, said silica characterized by a surface area of between about 80 m²/g. and about 300 m²/g., a median particle size of between about 20 microns and about 200 microns and a pore volume of between about 0.6 cc/g. and about 3.0 cc/g., with 2-methylpentyloxymagnesium chloride;
    (b) contacting the product of step (a) with silicon tetrachloride;
    (c) contacting the product of step (b) with trichlorosilane, with the proviso that the concentration of said silicon tetrachloride and said trichlorosilane contacting said products of steps (a) and (b), respectively, is such that the molar ratio of said silicon tetrachloride to said trichlorosilane is in the range of between about 70:30 and about 92:8;
    (d) contacting the product of step (c) with titanium tetrachloride, with the proviso that titanium tetrachloride is the sole titanium-containing compound utilized in the formation of said catalyst component.

36. A catalyst component in accordance with claim 35 wherein said step (a) occurs at a temperature in the range of between about 50° C. and about 110° C. for a period of between about 1½ hours and about 2½ hours.

37. A catalyst component in accordance with claim 36 wherein said step (b) occurs at ambient temperature followed immediately by said step (c) conducted at a temperature in the range of between about 25° C. and about 50° C over a period of between about 30 minutes and about 1 hour.

38. A catalyst component in accordance with claim 37 wherein said step (d) is conducted at between about 85° C and about 115° C. over a period of between about 45 minutes and about 1½ hours.

39. A catalyst component in accordance with claim 38 comprising the washing of the product of step (c) with hexane or heptane prior to said step (d).

40. A catalyst component in accordance with claim 39 comprising the washing of said product of step (d) with hexane or heptane.

41. A catalyst system comprising said catalyst component of claim 1, an aluminum-containing compound first co-catalyst component and at least one silane second cocatalyst component.

42. A catalyst system comprising said catalyst component of claim 18, an alkylaluminum-containing compound first co-catalyst component and at least one hydrocarbylalkoxysilane second co-catalyst component.

43. A catalyst system comprising said catalyst component of claim 35, a compound selected from the group consisting of triethylaluminum and tri-n-propylaluminum and isobutylisopropyldimethoxysilane.

* * * * *